United States Patent [19]

Araki et al.

[11] Patent Number: 5,404,719
[45] Date of Patent: Apr. 11, 1995

[54] ENGINE EXHAUST GAS PURIFICATION DEVICE

[75] Inventors: Yasushi Araki; Shinya Hirota, both of Susono, Japan

[73] Assignee: Toyota Jidosha Kabushiki Kaisha, Toyota, Japan

[21] Appl. No.: 133,482

[22] Filed: Oct. 7, 1993

[30] Foreign Application Priority Data

Oct. 13, 1992 [JP] Japan .................. 4-274204

[51] Int. Cl.⁶ .............................................. F01N 3/20
[52] U.S. Cl. ........................................ 60/276; 60/277; 60/285; 60/286; 60/289; 123/676
[58] Field of Search ............. 60/286, 289, 276, 277, 60/285, 307; 123/676, 689, 698, 699

[56] References Cited

U.S. PATENT DOCUMENTS

| | | | |
|---|---|---|---|
| 3,086,353 | 4/1963 | Ridgway | 60/289 |
| 3,303,003 | 2/1967 | Zimmer | 60/289 |
| 3,716,996 | 2/1973 | Maruoka | 60/286 |
| 3,747,346 | 7/1973 | Onoda | 60/286 |
| 4,033,123 | 7/1977 | Masaki | 60/286 |
| 4,104,361 | 8/1978 | Nishikawa | 423/239 |
| 4,615,173 | 10/1986 | Usui | 60/286 |
| 5,090,200 | 2/1992 | Arai | 60/286 |
| 5,189,876 | 3/1993 | Hirota | 60/286 |
| 5,207,990 | 5/1993 | Sekiya | 60/286 |
| 5,243,819 | 9/1993 | Woerner | 60/286 |

FOREIGN PATENT DOCUMENTS

| | | |
|---|---|---|
| 0503882 | 3/1992 | European Pat. Off. . |
| 62-97630 | 5/1987 | Japan . |
| 62-106826 | 5/1987 | Japan . |
| 62-117620 | 5/1987 | Japan . |
| 1-56816 | 12/1989 | Japan . |
| 3-135417 | 6/1991 | Japan . |

OTHER PUBLICATIONS

No Removal by Absorption into BaO-CuO Binary Oxides (J. Chem. Soc., Chem. Commun., pp. 1165–1166).

Formation and Decomposition of $BaCuO_{2.5}$ Prepared from a Mixture of Nitrates (Journal of Solid State Chemistry, pp. 176–179) (1991).

No Removal by Absorption into Ba-Cu-O Binary Oxides (67th CATSJ Meeting Abstracts: No. A9, Catalyst vol. 33 No. 2, pp. 87–90) (1991).

Primary Examiner—James C. Yeung
Assistant Examiner—Daniel J. O'Connor
Attorney, Agent, or Firm—Kenyon & Kenyon

[57] ABSTRACT

An engine comprising an exhaust passage having therein an $NO_x$ absorbent which absorbs $NO_x$ when the air-fuel ratio of the exhaust gas flowing into the $NO_x$ absorbent is lean and releases absorbed $NO_x$ when the air-fuel ratio of the exhaust gas flowing into the $NO_x$ absorbent becomes rich. The temperature of the $NO_x$ absorbent is maintained within a predetermined range by injecting fuel into the exhaust gas when the temperature of the $NO_x$ absorbent drops, and by injecting air into the exhaust gas when the temperature of the $NO_x$ absorbent becomes high.

6 Claims, 4 Drawing Sheets

ENGINE EXHAUST GAS PURIFICATION DEVICE

BACKGROUND OF THE INVENTION

1. Field of the Invention

The present invention relates to an engine exhaust gas purification device.

2. Description of the Related Art

With respect to an engine in which a lean air-fuel mixture is burned, the same applicant has proposed a new type of engine in which an $NO_x$ absorbent is arranged in the exhaust passage of the engine. This $NO_x$ absorbent absorbs the $NO_x$ when the air-fuel ratio of the exhaust gas flowing through the $NO_x$ absorbent is lean, and this $NO_x$ absorbent releases the absorbed $NO_x$ when the air-fuel ratio of the exhaust gas flowing through the $NO_x$ absorbent becomes rich. In this engine, the $NO_x$ produced when the lean air-fuel mixture is burned is absorbed by the $NO_x$ absorbent. The air-fuel ratio of the exhaust gas flowing into the $NO_x$ absorbent is temporarily made rich before the absorbing ability of the $NO_x$ absorbent is saturated, and at this time, the $NO_x$ is released from the $NO_x$ absorbent. In addition, at this time, the $NO_x$ thus released is reduced (see copending U.S. patent application Ser. No. 66,100 derived from PCT application JP92/01279).

However, this $NO_x$ absorbent has an $NO_x$ absorbing ability which depends on a temperature, and the $NO_x$ absorbing ability of the $NO_x$ absorbent becomes high when the temperature of the $NO_x$ absorbent is within a predetermined range. Nevertheless, in the above-mentioned engine, since the temperature of the $NO_x$ absorbent is not controlled so that it is maintained within the above-mentioned range, a problem arises in that the $NO_x$ absorbing ability of the $NO_x$ absorbent is reduced when the temperature of the $NO_x$ absorbent is above or below the above-mentioned range.

SUMMARY OF THE INVENTION

An object of the present invention is to provide an exhaust gas purification device in which the $NO_x$ absorbent can continuously exhibit a high $NO_x$ absorbing ability.

According to the present invention, there is provided an engine exhaust gas purification device in an engine exhaust passage, the device comprising: an $NO_x$ absorbent arranged in the exhaust passage and absorbing $NO_x$ when the air-fuel ratio of the exhaust gas flowing into the $NO_x$ absorbent is lean, the $NO_x$ absorbent releasing absorbed $NO_x$ when the air-fuel ratio of exhaust gas becomes rich; and control means for controlling the temperature of the $NO_x$ absorbent to maintain the temperature of the $NO_x$ absorbent within a predetermined range in which a high $NO_x$ absorbing ability of the $NO_x$ absorbent is obtained.

The present invention may be more fully understood from the description of preferred embodiments of the invention set forth below, together with the accompanying drawings.

DESCRIPTION OF PREFERRED EMBODIMENTS

Figure 1:
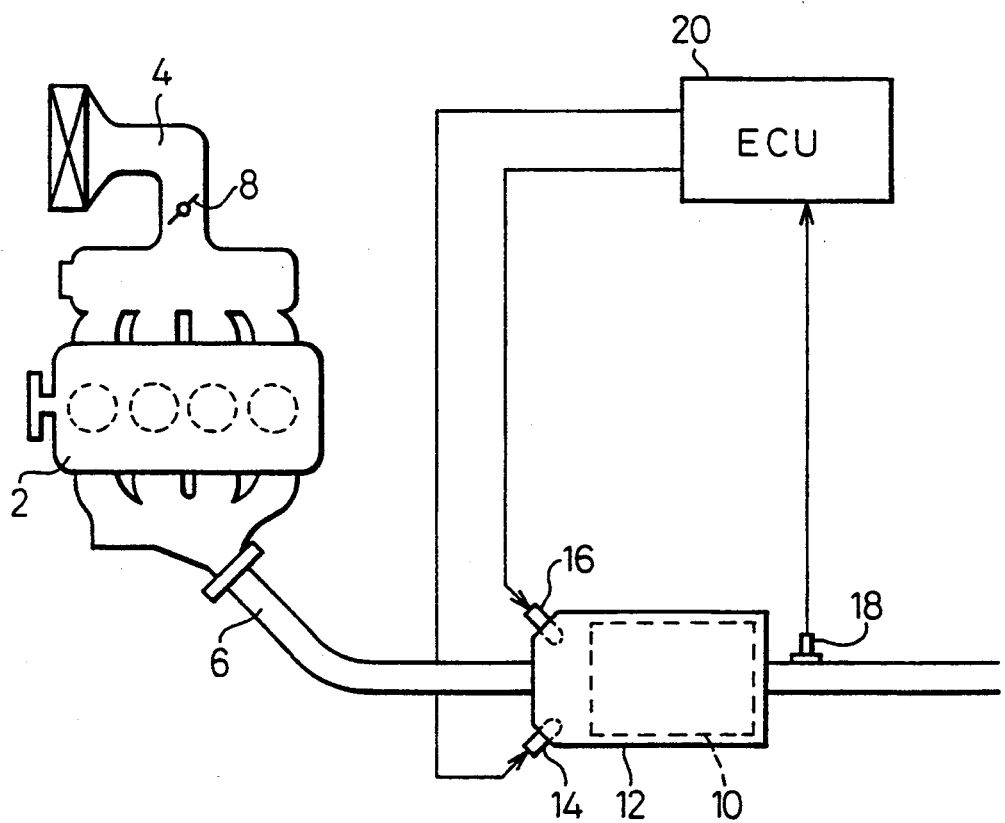
FIG. 1 is an overall view of an engine.

Referring to FIG. 1, reference numeral 2 designates a body of an engine capable of burning a lean air-fuel mixture, 4 an intake passage, 6 an exhaust passage, and 8 a throttle value arranged in the intake passage 4. A casing 12 including an $NO_x$ absorbent 10 therein is arranged in the exhaust passage 6. A fuel injector 14 for injecting fuel into the casing 12 and an air injector 16 for injecting air into the casing 12 are arranged in the interior of the casing 12 upstream of the $NO_x$ absorbent 10. The fuel injector 14 and the air injector 16 are connected to an electronic control unit (ECU) 20 and controlled by the ECU 20. A temperature sensor 18 is arranged in the exhaust passage 6 downstream of and near the $NO_x$ absorbent 10. This temperature sensor 18 produces an output voltage which is proportional to the temperature of the exhaust gas flowing out from the $NO_x$ absorbent 10, and the output voltage of the temperature sensor 18 is input into the ECU 20.

Figure 2:
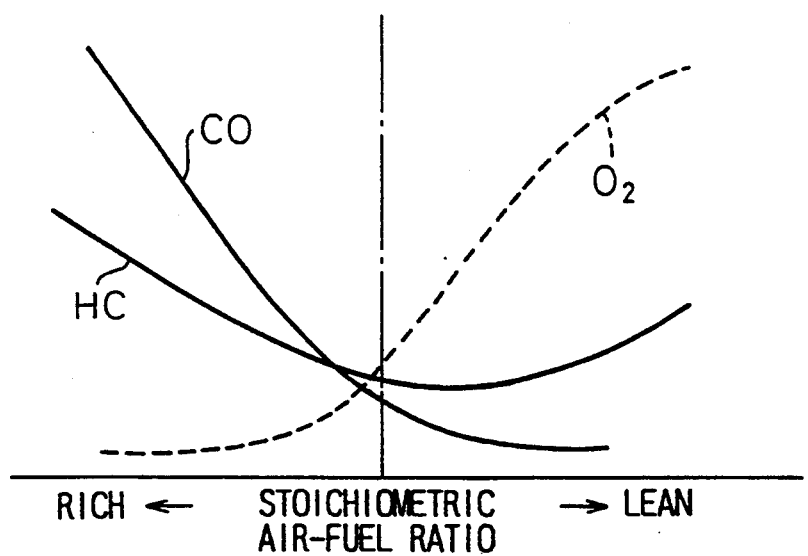
FIG. 2 is a diagram showing the concentration of unburned HC and CO and $O_2$ in the exhaust gas.

FIG. 2 schematically shows the concentration of representative components in the exhaust gas discharged from the combustion chamber of the engine. As seen from FIG. 2, the concentration of the unburnt HC and CO in the exhaust gas discharged from the combustion chamber increases as the air-fuel ratio of the air-fuel mixture fed into the combustion chamber becomes richer, and the concentration of the oxygen $O_2$ in the exhaust gas discharged from the combustion chamber is increased as the air-fuel ratio of the air-fuel mixture fed into the combustion chamber becomes leaner.

The $NO_x$ absorbent 10 contained in the casing 12 uses, for example, alumina as a carrier. On this carrier, at least one substance selected from alkali metals, for example, potassium K, sodium Na, lithium Li, and cesium Cs; alkali-earth metals, for example, barium Ba and calcium Ca; and rare-earth metals, for example, lanthanum La and yttrium Y and precious metals such as platinum Pt is carried. When referring to the ratio between the air and fuel (hydrocarbons) fed into the intake passage 4 of the engine and the exhaust passage 6 upstream of the $NO_x$ absorbent 10 as the air-fuel ratio of the exhaust gas flowing into the $NO_x$ absorbent 10, this $NO_x$ absorbent 10 performs the absorption and releasing operation of $NO_x$ by absorbing the $NO_x$ when the air-fuel ratio of the exhaust gas flowing into the $NO_x$ absorbent is lean, while releasing the absorbent $NO_x$ when the concentration of oxygen in the exhaust gas flowing into the $NO_x$ absorbent falls. Note that, where the fuel (hydrocarbons) or air is not fed into the exhaust passage 6 upstream of the $NO_x$ absorbent 10, the air-fuel ratio of the exhaust gas flowing into the $NO_x$ absorbent coincides with the air-fuel ratio of the air-fuel mixture fed into the combustion chamber, and in this case, the $NO_x$ absorbent 10 absorbs the $NO_x$ when the air-fuel ratio of the air-fuel mixture fed into the combustion chamber is lean and releases the absorbed $NO_x$ when the concentration of oxygen in the air-fuel mixture fed into the combustion chamber is lowered.

Figure 3A:
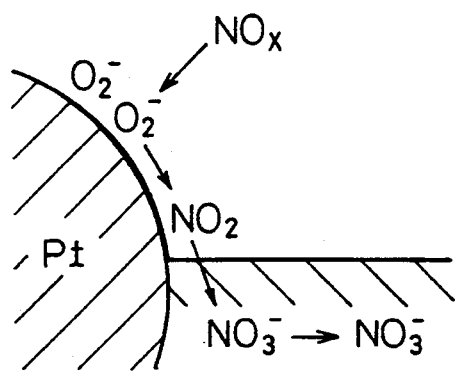
FIGS. 3A and 3B are views for explaining an absorbing and releasing operation of $NO_x$.
Figure 3B:
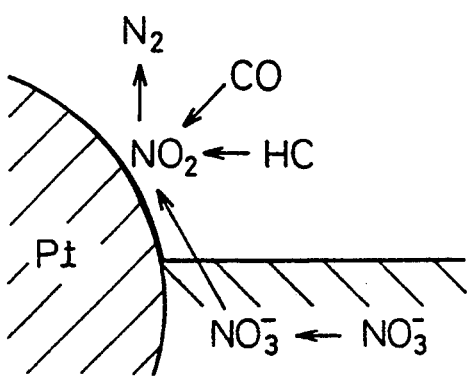

When the above-mentioned $NO_x$ absorbent 10 is disposed in the exhaust passage of the engine, this $NO_x$ absorbent 10 actually performs the absorption and releasing operation of $NO_x$, but there are areas of the exact mechanism of this absorption and releasing operation which are not clear. However, it can be considered that this absorption and releasing operation is conducted by the mechanism as shown in FIGS. 3A and 3B. This mechanism will be explained by using as an example a case where platinum Pt and barium Ba are carried on the carrier, but a similar mechanisms is obtained even if another precious metal, alkali metal, alkali earth metal, or rare earth metal is used.

Namely, when the exhaust gas flowing into the $NO_x$ absorbent becomes very lean, the concentration of oxygen in the exhaust gas flowing into the $NO_x$ absorbent is greatly increased. At this time, as shown in FIG. 3A, the oxygen $O_2$ is deposited on the surface of the platinum Pt in the form of $O_2^-$ or $O^{2-}$. The NO in the inflowing exhaust gas reacts with the $O_2^-$ or $O^{2-}$ on the surface of the platinum Pt and becomes $NO_2$ ($2NO+O_2 \rightarrow 2NO_2$). Subsequently, a part of the produced $NO_2$ is oxidized on the platinum Pt and absorbed into the absorbent. While bonding with the barium oxide BaO, it is diffused in the absorbent in the form of nitric acid ions $NO_3^-$ as shown in FIG. 3A. In this way, $NO_x$ is absorbed into the $NO_x$ absorbent 10.

So long as the oxygen concentration in the exhaust gas flowing into the $NO_x$ absorbent is high, the $NO_x$ is produced on the surface of the platinum Pt, and so long as the $NO_x$ absorption ability of the absorbent is not saturated, the $NO_x$ is absorbed into the absorbent and nitric acid ions $NO_3^-$ are produced. Contrary to this, when the oxygen concentration in the inflowing exhaust gas is lowered and the production of $NO_2$ is lowered, the reaction proceeds in a reverse direction ($NO_3^- \rightarrow NO_2$), and thus nitric acid ions $NO_3^-$ in the absorbent are released in the form of $NO_2$ from the absorbent. Namely, when the oxygen concentration in the exhaust gas flowing into the $NO_x$ absorbent is lowered, the $NO_x$ is released from the $NO_x$ absorbent 10. As shown in FIG. 2, when the degree of leanness of the exhaust gas flowing into the $NO_x$ absorbent becomes low, the oxygen concentration in the exhaust gas flowing into the $NO_x$ absorbent is lowered, and accordingly when the degree of leanness of the exhaust gas flowing into the $NO_x$ absorbent is lowered, the $NO_x$ released from the $NO_x$ absorbent 10 even if the air-fuel ratio of the exhaust gas flowing into the $NO_x$ absorbent is lean.

On the other hand, when the air-fuel ratio of the air-fuel mixture fed into the combustion chamber is made rich and the air-fuel ratio of the exhaust gas flowing into the $NO_x$ absorbent becomes rich, as shown in FIG. 2, a large amount of unburnt HC and CO is discharged from the engine, and this unburnt HC and CO react with the oxygen $O_2^-$ or $O^{2-}$ on the platinum Pt and are oxidized. Also, when the air-fuel ratio of the exhaust gas flowing into the $NO_x$ absorbent becomes rich, the oxygen concentration in the exhaust gas flowing into the $NO_x$ absorbent is lowered considerably, and therefore the $NO_2$ is released from the absorbent. This $NO_2$ reacts with the unburnt HC and CO as shown in FIG. 3B and is reduced. In this way, when the $NO_2$ no longer exists on the surface of the platinum Pt, the $NO_2$ is successively released from the absorbent. Accordingly, when the air-fuel ratio of the exhaust gas flowing into the $NO_x$ absorbent is made rich, the $NO_x$ is released from the $NO_x$ absorbent 10 in a short time.

As mentioned above, the $NO_x$ is absorbed in the $NO_x$ absorbent 10 when the air-fuel ratio of the exhaust gas flowing into the $NO_x$ absorbent is lean, and the $NO_x$ is released from the $NO_x$ absorbent 10 when the air-fuel ratio of the exhaust gas flowing into the $NO_x$ absorbent becomes rich. In the embodiment according to the present invention, in a majority of the operating states of the engine, a lean air-fuel mixture is burned in the combustion chamber. At this time, the $NO_x$ discharged from the combustion chamber is absorbed and stored in the $NO_x$ absorbent 10. However, in this case, if the burning of the lean air-fuel mixture continues to be carried out for a long time, the absorbing ability of the $NO_x$ by the $NO_x$ absorbent 10 is saturated and, as a result, the $NO_x$ absorbent 10 can no longer absorb the $NO_x$. Accordingly, in the embodiment according to the present invention, the air-fuel mixture fed into the combustion chamber is temporarily made rich to release the $NO_x$ from the $NO_x$ absorbent 10 before the absorbing ability of the $NO_x$ by the $NO_x$ absorbent 10 is saturated. At this time, the $NO_x$ released from the $NO_x$ absorbent 10 is reduced by the unburned HC and CO, and therefore, there is no danger that the $NO_x$ is discharged into the outside air.

Figure 4:
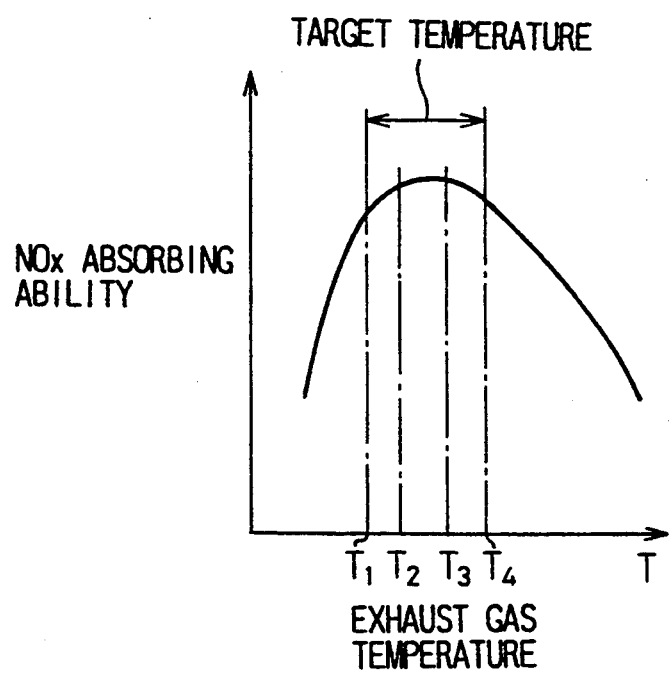
FIG. 4 is a diagram showing the relationship between the $NO_x$ absorbing ability of the $NO_x$ absorbent and the temperature of the exhaust gas.

FIG. 4 illustrates the relationship between the $NO_x$ absorbing ability of the $NO_x$ absorbent 10 and the temperature T of the exhaust gas flowing into the $NO_x$ absorbent 10. If the temperature T of the exhaust gas becomes lower than $T_1$ in FIG. 4, i.e., the temperature of the $NO_x$ absorbent 10 becomes low, since the oxidizing operation of $NO_x$ ($2NO+O_2 \rightarrow 2NO_2$) is weakened, the $NO_x$ absorbing ability of the $NO_x$ absorbent 10 is decreased as illustrated in FIG. 4. Conversely, if the temperature T of the exhaust gas becomes higher than $T_4$ in FIG. 4, i.e., the temperature of the $NO_x$ absorbent 10 becomes high, since the $NO_x$ absorbed in the $NO_x$ absorbent 10 is dissociated and naturally released from the $NO_x$ absorbent 10, the $NO_x$ absorbing ability of the $NO_x$ absorbent 10 is decreased as illustrated in FIG. 4. Accordingly, the $NO_x$ absorbing ability of the $NO_x$ absorbent 10 becomes high when the temperature T of the exhaust gas is between $T_1$ and $T_4$ in FIG. 4.

In the embodiment according to the present invention, to maintain the temperature T of the exhaust gas within a range from $T_1$ to $T_4$, when the temperature T of the exhaust gas becomes lower than $T_1$, fuel is injected into the casing 12 from the fuel injector 14 and, when the temperature T of the exhaust gas becomes higher than $T_4$, air is injected into the casing 12 from the air injector 16. Namely, when the air-fuel ratio of the exhaust gas flowing into the $NO_x$ absorbent is lean, the exhaust gas contains a large amount of oxygen therein. Accordingly, if fuel is injected into the casing 12 from the fuel injector 14, the fuel is immediately burned, and thus the temperature T of the exhaust gas is increased by the heat of the buring of fuel. Conversely, if air is injected into the casing 12 from the air injector 16, the exhaust gas is cooled by this air, and thus, the temperature T of the exhaust gas is lowered. Therefore, the temperature T of the exhaust gas is maintained between $T_1$ and $T_4$.

A large amount of fuel is not required for increasing the temperature T of the exhaust gas, and therefore, when fuel is injected into the casing 12 from the fuel injector 14, the air-fuel ratio of the exhaust gas flowing into the $NO_x$ absorbent is maintained lean. Accordingly, at this time, the $NO_x$ in the exhaust gas is absorbed in the $NO_x$ absorbent 10.

Figure 5:
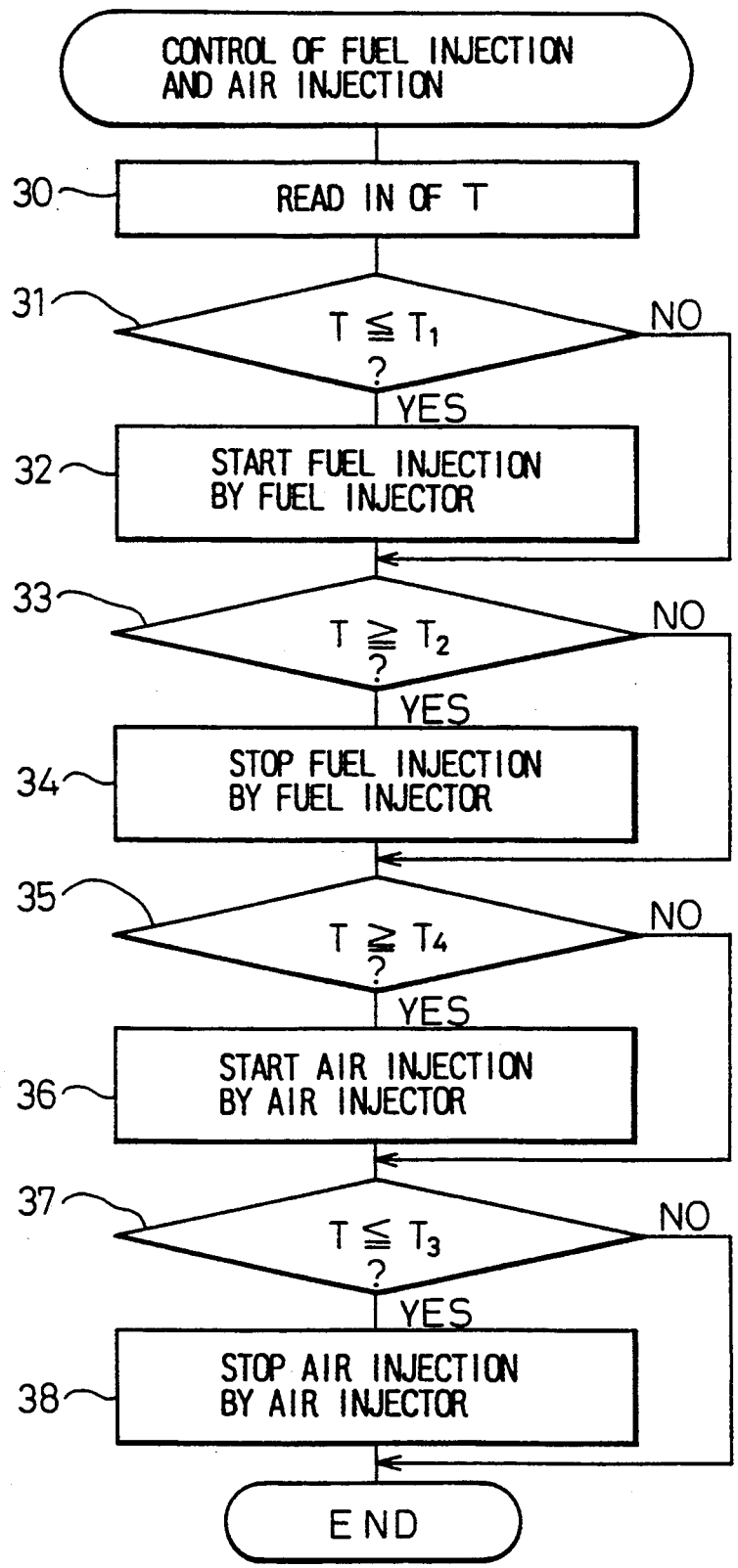
FIG. 5 is a flow chart for controlling the fuel injector and the air injector.

FIG. 5 illustrates a routine for controlling the fuel injector 14 and the air injector 16, and this routine is processed by sequential interruptions at predetermined time intervals.

Referring to FIG. 5, in step 30, the temperature T of the exhaust gas, which is detected by the temperature sensor 18, is read. Then, in step 31, it is determined whether or not the temperature T of the exhaust gas is equal to or less than the lower limit temperature $T_1$ (FIG. 4). If $T \leq T_1$, the routine goes to step 32, and the fuel injector by the fuel injector 14 is started. Then, the routine goes to step 33. Conversely, when it is determined in step 31 that $T > T_1$, the routine jumps to step 33.

In step 33, it is determined whether or not the temperature T of the exhaust gas is equal to or higher than a predetermined temperature $T_2$ (FIG. 4) which is slightly higher the lower limit temperature $T_1$. If $T \geq T_2$, the routine goes to step 34, and the fuel injection by the fuel injector 14 is stopped. Then, the routine goes to step 35. Conversely, if it is determined in step 33 that $T > T_2$, the routine jumps to step 35.

In step 35, it is determined whether or not the temperature T of the exhaust gas is equal to or higher than the upper limit temperature $T_4$ (FIG. 4). If $T \geq T_4$, the routine goes to step 36, and the air injection by the air injection 16 is started. Then, the routine goes to step 37. Conversely, if it is determined in step 35 that $T < T_4$, the routine jumps to step 37.

In step 37, it is determined whether or not the temperature T of the exhaust gas is equal to or less than a predetermined temperature $T_3$ (FIG. 4) which is slightly lower than the upper limit temperature $T_4$, but is larger than $T_2$. If $T \leq T_3$, the routine goes to step 38, and the air injection by the air injector 16 is stopped. Then the processing cycle is completed. Conversely, if it is determined in step 37 that $T > T_3$, the processing cycle is completed.

In the above mentioned routine, when the temperature T of the exhaust gas is reduced to below $T_1$, the fuel injection by the fuel injector 14 is started and, when the temperature T of the exhaust gas exceeds $T_2$, the fuel injection by the fuel injector 14 is stopped. In addition, when the temperature T of the exhaust gas exceeds $T_4$, the air injection by the air injector 16 is started and, when the temperature T of the exhaust gas is reduced below $T_3$, the air injection by the air injector 16 is stopped. However, the fuel injection by the fuel injector 14 may be stopped when a predetermined time has elapsed after the fuel injection is started, and the air injection by the air injector 16 may be stopped when a predetermined time has elapsed after the air injection is started.

In the embodiment shown in FIG. 1, fuel is fed into the casing 12 to heat the $NO_x$ absorbent 10. However, instead of this, it is possible to heat the $NO_x$ absorbent 10 by an electric heater arranged in the interior of the casing 12 upstream of the $NO_x$ absorbent 10. In addition, in the embodiment shown in FIG. 1, air is injected into the casing 12 to cool the $NO_x$ absorbent 10. However, instead of this, it is possible to introduce an engine cooling water of the radiator to the outer circumference of the casing 12 and control the amount of the engine cooling water, and it is also possible to introduce a wind, which occurs when the motor vehicle is driven, to the outer circumference of the casing 12 and control of the amount of wind flowing around the casing 12.

While the invention has been described by reference to specific embodiments chosen for purposes of illustration, it should be apparent that numerous modifications could be made thereto by those skilled in the art without departing from the basic concept and scope of the invention.

We claim:

1. An engine exhaust gas purification device in an engine exhaust passage, said device comprising:

an $NO_x$ absorbent arranged in the exhaust passage and absorbing $NO_x$ when an air-fuel ratio of exhaust gas flowing into the $NO_x$ absorbent is lean, said $NO_x$ absorbent releasing absorbed $NO_x$ when said air-fuel ratio of the exhaust gas becomes rich; and control means for controlling the temperature of said $NO_x$ absorbent to maintain the temperature of said $NO_x$ absorbent within a predetermined range in which a high $NO_x$ absorbing ability of said $NO_x$ absorbent is obtained, wherein the control means includes one of a heating means for heating the exhaust gas flowing into the $NO_x$ absorbent and a cooling means for cooling the exhaust gas flowing into the $NO_x$ absorbent to control the temperature of the exhaust gas flowing into the $NO_x$ absorbent, the heating means comprising a fuel injector for injecting fuel into the exhaust gas flowing into the $NO_x$ absorbent only when the temperature of the exhaust gas flowing into the $NO_x$ absorbent becomes lower than a first temperature of the predetermined range and wherein the cooling means comprises an air injector for injecting air into the exhaust gas flowing into the $NO_x$ absorbent only when the temperature of the exhaust gas flowing into the $NO_x$ absorbent becomes higher than a second temperature of the predetermined range, wherein the second temperature is higher than the first temperature.

2. An engine exhaust gas purification device according to claim 1, wherein said $NO_x$ absorbent is arranged in a casing, and said fuel injector is arranged in said casing to inject fuel into the interior of said casing upstream of said $NO_x$ absorbent.

3. An engine exhaust gas purification device according to claim 1, wherein said heating means stops the fuel injection by said fuel injector when the temperature of the exhaust gas flowing into said $NO_x$ absorbent becomes higher than a predetermined temperature which is slightly higher than said lower limit temperature.

4. An engine exhaust gas purification device according to claim 1, wherein said $NO_x$ absorbent is arranged in a casing and said air injector is arranged in said casing to inject air into the interior of said casing upstream of said $NO_x$ absorbent.

5. An engine exhaust gas purification device according to claim 1, wherein said cooling means stops the air injection by said air injector when the temperature of the exhaust gas flowing into said $NO_x$ absorbent becomes lower than a predetermined temperature which is slightly lower than said upper limit temperature.

6. An engine exhaust gas purification device according to claim 1, wherein said $NO_x$ absorbent contains at least one substance selected from alkali metals comprising potassium, sodium, lithium, cesium; alkali earth metals comprising barium, calcium; and rare earth metals comprising lanthanum, yttrium, and contains platinum.

* * * * *